United States Patent
Gerstenberger et al.

(10) Patent No.: US 9,491,615 B2
(45) Date of Patent: Nov. 8, 2016

(54) DETECTION OF COLLISIONS OF RADIO COVERAGE CELL IDENTIFIERS

(75) Inventors: Dirk Gerstenberger, Stockholm (SE); Tarmo Kuningas, Solna (SE); Daniel Larsson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 723 days.

(21) Appl. No.: 12/625,205

(22) Filed: Nov. 24, 2009

(65) Prior Publication Data

US 2010/0317351 A1 Dec. 16, 2010

Related U.S. Application Data

(60) Provisional application No. 61/185,771, filed on Jun. 10, 2009.

(51) Int. Cl.
| | |
|---|---|
| *H04W 8/26* | (2009.01) |
| *H04W 48/12* | (2009.01) |
| *H04W 36/00* | (2009.01) |
| *H04W 64/00* | (2009.01) |

(52) U.S. Cl.
CPC .......... *H04W 8/26* (2013.01); *H04W 36/0083* (2013.01); *H04W 48/12* (2013.01); *H04W 64/003* (2013.01)

(58) Field of Classification Search
CPC ...... H04L 1/00; H04W 24/10; H04W 36/00; H04W 8/26; H04W 16/32; H04W 84/10; G01S 5/10; H04Q 7/00
USPC .............. 455/436, 444, 446, 450, 452.1, 455/456.1–456.6; 370/241, 254, 328, 331, 370/338
See application file for complete search history.

(56) References Cited

U.S. PATENT DOCUMENTS

| | | | |
|---|---|---|---|
| 2007/0021122 A1* | 1/2007 | Lane et al. ................. 455/441 |
| 2009/0012929 A1* | 1/2009 | Swan ..................... G06F 3/0613 |
| 2009/0047956 A1* | 2/2009 | Moe et al. ................. 455/436 |
| 2009/0129291 A1* | 5/2009 | Gupta .................... H04W 8/26 370/254 |
| 2009/0219905 A1 | 9/2009 | Khandekar et al. |
| 2010/0189038 A1* | 7/2010 | Chen ..................... H04L 1/0001 370/328 |
| 2010/0227617 A1* | 9/2010 | Jung ........................ H04W 8/26 455/438 |
| 2010/0234016 A1* | 9/2010 | Palanki ................. H04W 48/08 455/424 |

(Continued)

FOREIGN PATENT DOCUMENTS

| | | |
|---|---|---|
| JP | 2010549820 | 3/2009 |
| JP | T 2011-527880 | 11/2011 |

(Continued)

OTHER PUBLICATIONS

36PP TSG-RAN WG1 Meeting #58, R1-093626, Shenzhen, China, Aug. 24-28, 2009, pp. 1-5.

(Continued)

*Primary Examiner* — Khawar Iqbal

(57) ABSTRACT

Additional information is included in or used to generate a positioning reference signal to enable detection of a cell identifier "collision" between two different cells associated with two or more base stations. In one example embodiment, a user equipment terminal detects the collision using the additional information included in or used to generate positioning reference signals sent by two or more base stations and reports the collision to the network, and the network resolves the collision by assigning a different cell identifier to one of the colliding cells.

17 Claims, 7 Drawing Sheets

(56) References Cited

U.S. PATENT DOCUMENTS

| | | | | |
|---|---|---|---|---|
| 2010/0234028 | A1* | 9/2010 | Narasimha | H04W 36/0055 455/437 |
| 2010/0322227 | A1* | 12/2010 | Luo | H04B 7/024 370/345 |
| 2011/0013592 | A1* | 1/2011 | Uemura | H04W 24/10 370/331 |
| 2011/0038326 | A1* | 2/2011 | Davies | H04W 8/26 370/329 |
| 2011/0159901 | A1* | 6/2011 | Frenger | H04L 5/0082 455/502 |
| 2012/0040691 | A1* | 2/2012 | Han | G01S 1/042 455/456.1 |
| 2013/0315168 | A1* | 11/2013 | Frank | G01S 5/10 370/329 |
| 2015/0016396 | A1* | 1/2015 | Gaal | G06F 7/584 370/329 |

FOREIGN PATENT DOCUMENTS

| | | |
|---|---|---|
| WO | WO 2009/022974 | 2/2009 |
| WO | WO 2009/060935 | 5/2009 |
| WO | WO 2009/067452 | 5/2009 |
| WO | WO 2009/111483 | 9/2009 |

OTHER PUBLICATIONS

3GPP TS 36.211 V8.7.0 (May 2009), pp. 1-83.
3GPP TS 36.300 V9.0.0 (Jun. 2009), pp. 1-157.
Notification of Transmittal of International Preliminary Report for International Search Report and Written Opinion of the International Searching Authority mailed Oct. 1, 2010 in corresponding Application No. PCT/SE2009/051509.
3GPP TSG-RAN WG2 #61; R2-081046, Sorrento, Italy, Feb. 11-15, 2008; Mechanism for UE measurements and reporting of global cell identity, 3 pages.
English Translation of Japanese Office Action dated Mar. 25, 2014 in Japanese Application No. 2012-514914.
Indonesian Office Action dated Feb. 27, 2014.
Supplementary European Search Report, Nov. 6, 2012, in EP Application No. 09845914.2.
Huawei: "Detection of Conflicting Cell Identities", 3GPP Draft; R3-071947, Oct. 3, 2007, XP050162733, the entire document.
Nokia Siemens Networks et al.: "Solutions to the 36.902A s Automated Configuration of Physical Cell Identity Use Case", R3-080812, Mar. 26, 2008, XP050164010, the entire document.

* cited by examiner

DETECTION OF COLLISIONS OF RADIO COVERAGE CELL IDENTIFIERS

PRIORITY APPLICATION

The application claims priority from U.S. patent application 61/185,771, filed on Jul. 7, 2009, the disclosure of which is incorporated herein by reference.

TECHNICAL FIELD

The technical field relates to radio communications, and in particular, to detecting collisions of radio coverage cell identifiers.

BACKGROUND

In a typical radio communications system, radio communications terminals, referred to as radio terminals or user equipment terminals UEs, communicate via an access network with other networks like the Internet. For example, a radio access network (RAN) in a cellular communications system covers a geographical area which is divided into coverage cells, with each cell being served by a base station, e.g., a radio base station (RBS), which in some networks is also called a "NodeB" or an enhanced Node B "eNodeB." Each base station typically serves several cells. One common deployment is 3-cell base station installations, where a base station serves three cells. Other wireless systems, like WiFi systems, employ access points (APs) to provide network access to wireless terminals. For simplicity, wireless access points, radio base stations, and the like are referred to generally as base stations and user equipment terminals, access terminals, and the like are referred to generally as radio terminals.

A base station communicates over the air interface operating on radio frequencies with the radio terminals within range of the base stations. The radio signals may either be dedicated signals to and from specific radio terminals, multicast signals intended for a subset of the radio terminals in a cell or coverage area, or broadcast signals from the base station to all radio terminals in a cell or coverage area. For simplicity, a cell is understood to include a radio coverage area or the like. A base station broadcasts information to all the radio terminals in a cell using the broadcast channel of the serving cell. Each cell is identified by a cell identifier within the local radio area, which is broadcast in the cell.

Small scale base stations have recently been introduced that are connected to broadband internet service and provide coverage for very small areas sometimes called femto cells. Femto cells are similar to WiFi "hotspots" but are part of a cellular network rather than a wireless local area network (WLAN). The femto base stations work in many ways like a larger "macro" base station would, but on a much smaller scale with low output power designed for small spaces such as apartments, houses, offices, etc. A pico base station is a "small" base station, and a femto base station (e.g., a home base station) may be even smaller. However, for purposes of this application, a femto base station includes any small or very small base station that is distinguishable from a macro base station. Femto base stations provide a better signal in smaller interior or closed spaces where signal quality between regular macro base stations and mobile phones is poor due to the proximity of macro base station towers or just due to the material of the building or other obstructions blocking the signal. Instead of using a traditional base station for access, the radio terminal gains access through the femto base station to gain access to the IP access network.

FIG. 1 shows an example of a cellular communications system that includes a small scale femto base station and a traditional macro base station. A first building 1 includes a radio terminal 2 that receives radio signals from a macro base station 3. The macro base station 3 is coupled to a core network 5 either directly or through a radio access network 4. The core network 5 provides access to the Internet 6 and other networks. A second building 7 includes another radio terminal 8 that receives radio signals from a femto base station 9. The femto base station 9 may be coupled, typically via some broadband access mechanism (wired or wireless), to the core network 5 either directly or through a radio access network 4. Again, the core network 5 provides access to the Internet 6 and other networks. Because the femto base station is located inside the building 7 and is typically only intended to provide coverage within and in close proximity to the building 7, its transmit power can be considerably lower than that of the macro base station 3, which has a much larger and varied coverage area, while still providing high data rate service. Cells managed by macro and femto base stations all require cell identifiers. As the number of macro and femto cells increases, managing cell identifiers becomes more complex.

In a conventional wireless network, each cell is assigned a long identifier which may be referred to as, for example, a global cell identifier ("GCI"), a sector identifier ("SectorID"), an access node identifier ("ANID"), or some other type of identifier. Additionally, each cell may be assigned a short identifier, which may be referred to as, for example, a physical cell identifier ("PCI"), a pilot pseudorandom number ("PilotPN"), or as some other type of identifier. The short identifier, referred generally hereafter as PCI, may be used to modulate physical layer channels and is also used in neighboring cell measurements and measurement reporting by the radio terminal.

Current cellular radio systems include for example Third Generation (3G) Universal Mobile Telecommunications System (UMTS) operating using Wideband Code Division Multiple Access (WCDMA) and Fourth generation (4G) systems, like the Long Term Evolution (LTE) of UMTS operating using Orthogonal Frequency Division Multiple Access (OFDMA). One important focus area in the LTE and System Architecture Evolution (SAE) standardization work is to ensure that the new network is simple to deploy and cost efficient to operate. The vision is that the new system will be self-optimizing and self-configuring in as many aspects as possible. Such self-management is challenging with regard to cell identifiers as the number of macro and femto cells increases. One particular challenge is "collisions" between two cells using the same cell identifier.

The total number of different PCIs is typically limited. Consequently, it is desirable for a network operator to ensure that the same PCI is not used by cells that are relatively close to each other to avoid collisions between communications of neighboring cells. This also means that the PCI for a macrocell in a specific location is unique and sufficient to identify the macrocell. Even with network planning, PCI allocation is a demanding task to ensure that neighboring macro cells do not use the same PCI. But this is not feasible in an unplanned or ad-hoc network employing many small-coverage cells points. In an ad-hoc network, a network operator or a customer may deploy a base station without knowing which PCI should be used to ensure that collisions do not occur (if collisions are indeed entirely avoidable).

3GPP has standardized PCI selection algorithms for femto or home base stations referred as HeNBs in TS 36.300. The base station, referred to as an eNB, bases the selection of its PCI either on a centralized or distributed PCI assignment algorithm. For centralized PCI assignment, an operations and maintenance node (OAM) signals a specific PCI value which is selected by the eNB as its PCI. For distributed PCI assignment, the OAM signals a list of PCI values to the eNBs. An eNB may restrict this list by removing PCIs that are: a) reported by UEs; b) reported over the X2 interface by neighboring eNBs; and/or c) acquired through other implementation dependent methods, e.g., heard over the air using a downlink receiver. The eNB selects a PCI value randomly from the remaining list of PCIs.

The problem with this approach is that it may not work, particularly in heterogeneous networks with many macro and/or femto cells. A centralized PCI selection algorithm relies on the OAM to provide a single PCI value that does not collide with any neighbor cells. Although this is possible to achieve for macro cell deployment, based on careful cell planning, as mentioned above, it is not possible in certain situations such as a heterogenous network of HeNBs or other ad hoc networks. Another issue is that the exact location of an HeNB is difficult to determine, especially in the vertical axis, e.g., in an apartment building. Even if the HeNBs report detailed radio measurements to an OAM, those radio measurements can change very quickly. Indeed, the HeNB may be moved, e.g., from under a table to the window sill, potentially creating a new PCI collision.

The distributed PCI selection algorithm takes local information into account so that the HeNB can choose its PCI. In this approach, neighboring PCIs are reported by UEs, but a HeNB does not have any associated UEs until it starts transmitting making this approach ineffective during initial PCI selection. Even if a temporary initial PCI is used, a HeNB likely only has a few associated UEs, and their reports may not provide a 360 degree view of PCIs being transmitted by nearby base stations. Although some HeNBs may be able to detect PCIs being transmitted by some nearby base stations, the range of an HeNB receiver is usually limited.

Given the high probability of PCI collisions in the situations outlined above, notwithstanding the standardized PCI selection approaches, there is a need for a more effective technique for detecting and resolving collisions in wireless networks.

SUMMARY

Technology is provided for detecting collisions of radio coverage cell identifiers in the context of a radio communications system that includes multiple radio base stations and multiple radio terminals. A first positioning reference signal is determined for a first cell associated with a first radio base station that is based on a first identifier associated with this cell. A second positioning reference signal is determined for a second cell associated with a second radio base station that is based on a second identifier associated with this cell. A radio terminal is capable of detecting the first and second positioning reference signals. Information is obtained from the radio terminal that the first and second cells associated with the first and second base stations transmitted a same cell identifier and different positioning reference signals. Based on that obtained information, a collision between the first and second cell identifiers is determined.

The radio communications system includes a network including or coupled to the radio base stations. In an example embodiment, the collision between the first and second cell identifiers is reported to a node in the network. Ultimately, the collision is resolved, e.g., by associating a different, non-conflicting cell identifier to either of the first or second cells.

In an example embodiment, the positioning reference signals may each be determined using an associated cell identifier and an offset.

In an example embodiment, the method is implemented in a network node with the obtained information being determined by the radio terminal and transmitted to the network node.

One aspect is that the radio terminal can generate information useable to determine the geographic location of the radio terminal from the first and second positioning reference signals. For example, the obtained information may include or may be used to generate a time difference of arrival at the radio terminal between the first and second positioning reference signals and the geographic location of the radio terminal may be determined based on the time difference of arrival using a triangulation technique.

In an example embodiment, the first cell identifier is a physical cell identifier and the second cell identifier is a physical cell identifier. The first cell identifier included with the first positioning reference signal indicates an extended physical cell identifier for the first cell, and the second cell identifier included with the second positioning reference signal indicates an extended physical cell identifier for the second cell. In this case, there is a collision when the physical cell identifiers are the same for the first cell and the second cell and the extended physical cell identifiers are different for the first cell and the second cell. In a next step, the UE reports the collision to the network, and then the network resolves the collision by allocating non-colliding physical cell identifiers to the colliding cells.

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs).

Figure 1:
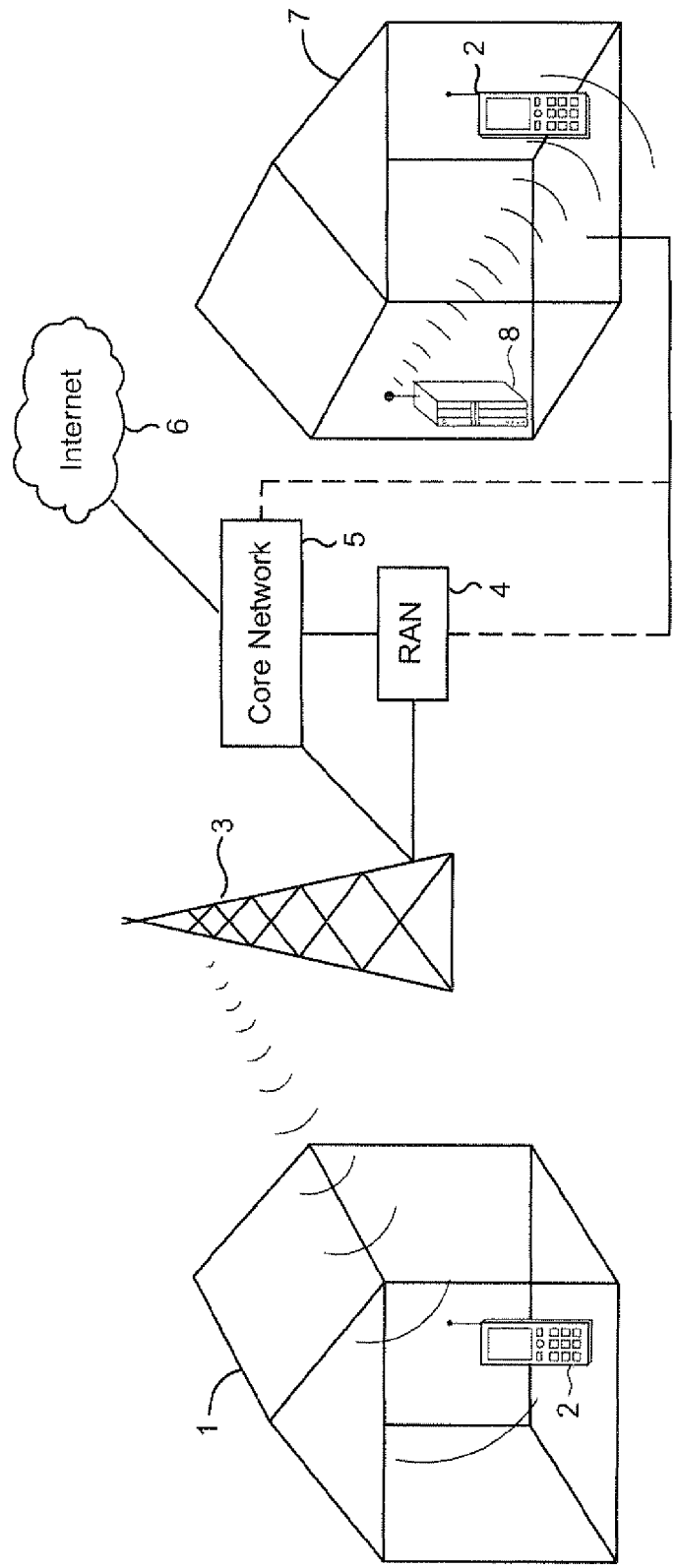
FIG. 1 illustrates a macro base station and a femto base station, e.g., an HeNB, in a cellular communications system.
Figure 2:
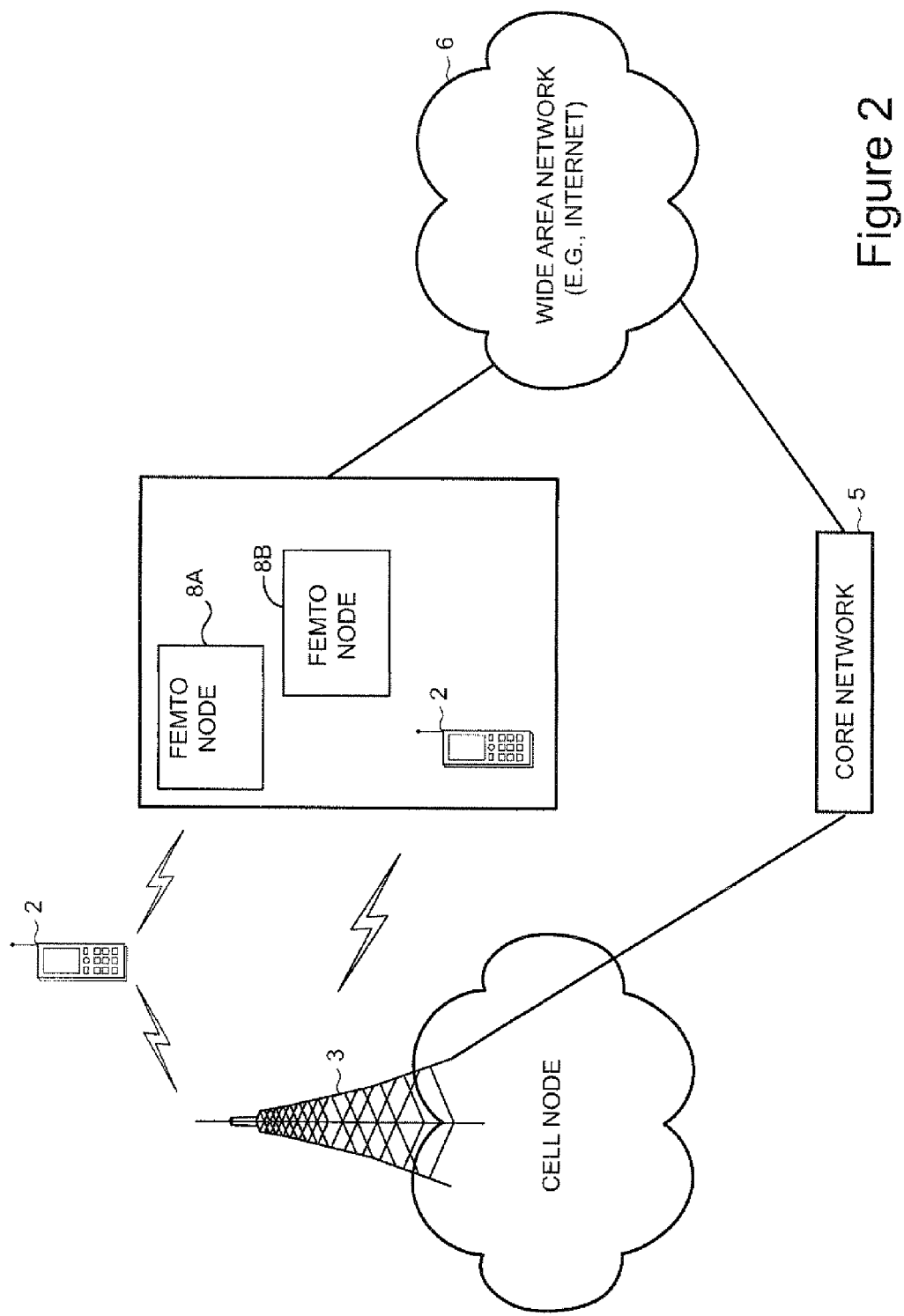
FIG. 2 illustrates a cellular communications system with macro and femto base stations.

FIG. 2 illustrates a cellular communications system with macro and femto base stations. The system includes multiple femto nodes (e.g., femto nodes 8A and 8B) installed in a relatively small area coverage network environment (e.g., in one or more user residences). Each femto node may be coupled to a wide area network 6 (e.g., the Internet) and a mobile operator core network 5 via a DSL router, a cable modem, a wireless link, or other connectivity means (not shown). The owner of a femto node may subscribe to mobile service offered through the mobile operator core network 5. In addition, a radio access terminal like UE 2 may be capable of operating both in macro environments and in smaller area coverage (e.g., residential) network environments. In other words, depending on the current location of the radio access terminal 2, the radio terminal 2 may be served by a macro base station cell 3 associated with the mobile operator core network 5 or by any one of a set of femto nodes 8A and 8B that reside within a corresponding user residence. For example, when a subscriber is outside his home, he may be served by a standard macro base station, and when the subscriber is near or inside his home, he may be served by a femto node.

Figure 3:
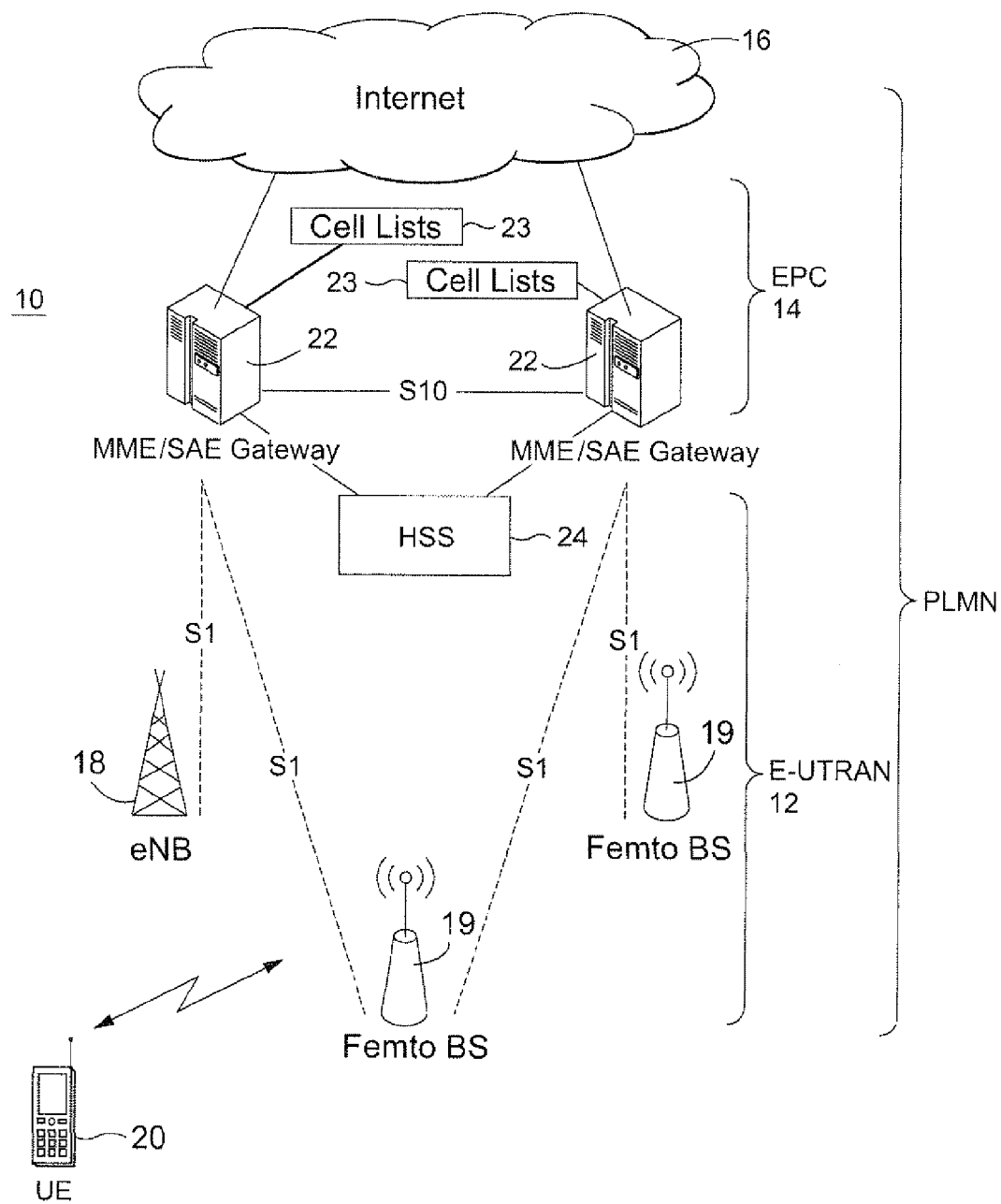
FIG. 3 is a function block diagram of an example LTE mobile radio communication system including macro and femto base stations.

The technology in this application is well-suited for, and therefore sometimes described in the context of, an LTE system in order to provide an example and non-limiting context for explanation. But this technology may be used in any modern cellular communications system and is not limited to LTE, e.g., WCDMA, etc. FIG. 3 illustrates an example of an LTE type mobile communications system 10. An E-UTRAN 12 includes E-UTRAN NodeBs (eNodeBs) 18 (only one is shown) that provide E-UTRA user plane and control plane protocol terminations towards a user equipment (UE) terminal 20 over a radio interface. Also shown are two femto base stations 19. The base stations 18 and 19 are communicate via an S1 interface to an Evolved Packet Core (EPC) 14 which includes a Mobility Management Entity (MME) and to a System Architecture Evolution (SAE) Gateway. The MME/SAE Gateway is shown as a single node 22 in this example and is analogous in many ways to an SGSN/GGSN gateway in UMTS and in GSM/EDGE. But the MME and SAE may be separate nodes. The MME/SAE gateways may communicate via an S10 interface. The MME/SAE may include a memory 23 for storing cells lists for the base stations including for example neighbor cell relation (NCR) lists, black and/or white cell lists, etc. The E-UTRAN 12 and EPC 14 together form a Public Land Mobile Network (PLMN). The MMEs/SAE Gateways 22 are connected to directly or indirectly to the Internet 16 and to other networks. The base stations 18 and 19 may communicate with the Home Subscriber Server (HSS) including HLR and/or VLR databases 24 possibly via the MME/SAE 22.

Figure 4:
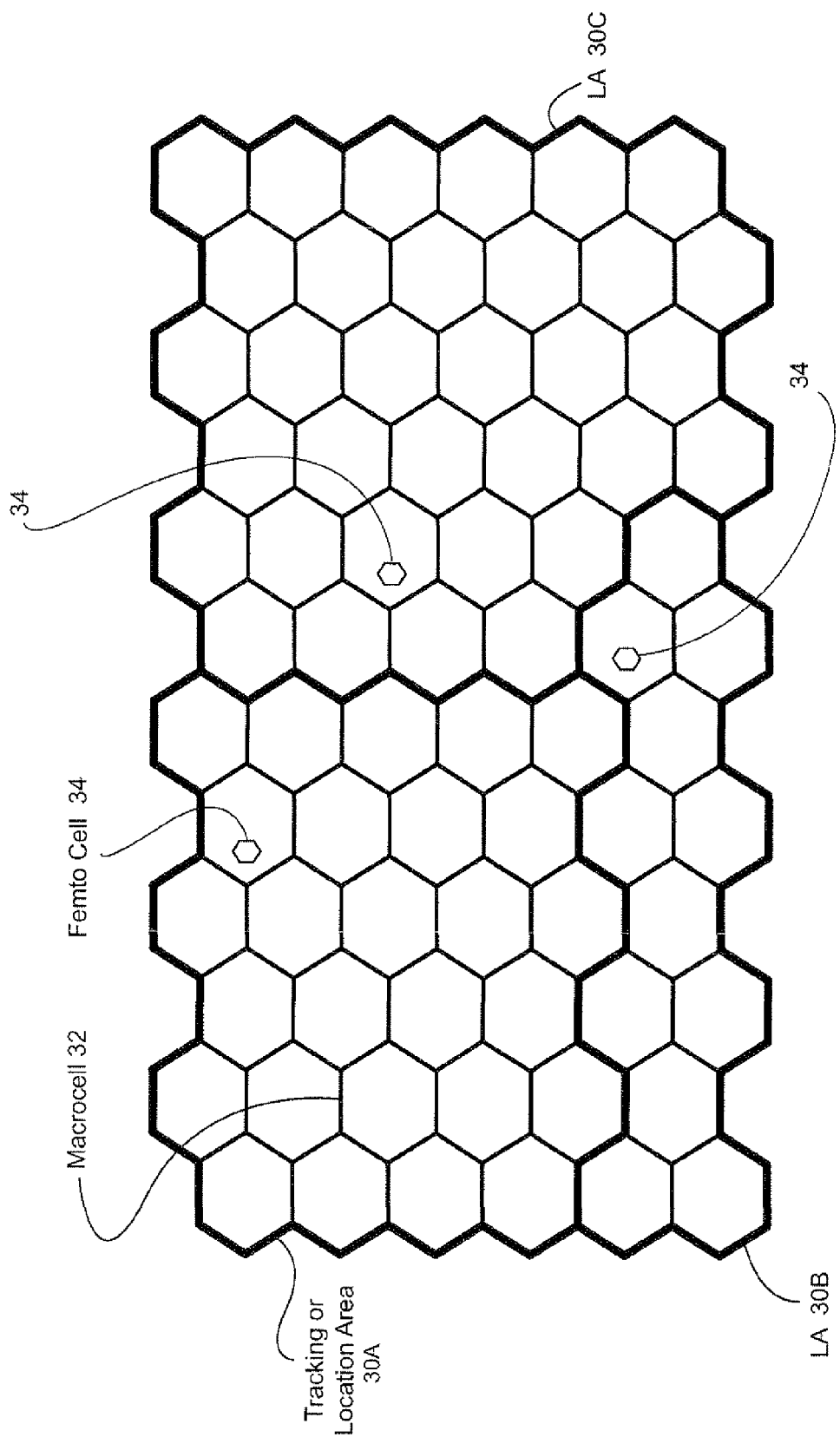
FIG. 4 is a diagram that illustrates a simple example of coverage areas for a wireless communication system.

FIG. 4 illustrates an example of a coverage map with several tracking, routing, or location areas 30A, 30B, and 30C, each of which includes several macro coverage cells 32. Here, areas of coverage associated with tracking areas 30A, 30B, and 30C are delineated by the wide lines, and the macrocells 32 are represented by hexagons. The tracking areas 30A, 30B, and 30C also include femto coverage cells 34. In this example, each of the femto cells is depicted within a macrocell, but it will be appreciated, however, that a femto cell may lie partially within or outside of a macro cell 704. Also, one or more pico cell (not shown) may be defined within one or more tracking areas or macrocells.

In current radio communications system, a function that is of increasing interest is determining a current position of a radio terminal. The term user positioning is the process of determining radio terminal coordinates in space. User positioning in wireless networks is particularly interesting due to users' mobility, but is also challenging with wide-spread network coverage, various environments and the dynamic nature of radio signals. Once the coordinates are available, the position can then be mapped to a certain place, or location. The mapping function and delivering the location information on request are a part of the location service which is required for basic emergency services and other services like location-aware and location-based services.

The second, third and future generation cellular systems can be equipped with a number of different positioning methods, thereby enabling location services to the cellular subscribers. Some known positioning determining techniques used in wireless communications may be based on:

1-cell identification where serving cell coverage is associated with a certain area, which can be used together with timing advance, making positioning more precise by measuring the round trip time, 2-triangulation based on estimating angles of arrival (AOA) measured from the phase difference of signals received from the same user equipment by different antenna elements, 3-trilateration based on estimating time of arrival (TOA), where the distance k calculated by estimating TOA of received signals from three or more sites, 4-multilateration based on estimating Time Difference Of Arrival (TDOA) of signals from three or more sites, and 5-assisted-GPS (A-GPS) which combines the mobile technology and GPS and enhancing user equipment receiver sensitivity by providing orbit and other data to the user equipment.

Enhanced Observed Time Difference (E-OTD) and Observed TDOA (OTDOA), which are two variants of TDOA, have been used in GSM and UMTS networks, respectively. Advanced Forward Link Trilateration (AFLT) has been adopted in CDMA networks.

For the purpose of mobile positioning, 3GPP has discussed introducing specific reference signals (RS), so-called positioning reference signals (PRS), which may be transmitted in addition to cell specific reference signals (CRS) in certain subframes. Specific but non-limiting example implementation proposals for LTE positioning using PRS may be found in "Introduction of LTE Positioning," 3GPP TSG-RAN WG1 Meeting #58, Shenzhen, China, Aug. 24-28, 2009, the disclosure of which is incorporated herein by reference. A base station may transmit PRS information that contains a specific PRS pattern to be measured by radio terminals. A radio base station may use different PRS patterns for different cells but may also use the same PRS pattern for cells served by the same radio base station, for example, all cells in a three sector site.

Additional information may be included in or used to generate a positioning reference signal broadcast from a base station to enable detection and resolution of a cell identifier "collision" between two different cells associated with different base stations. In one example embodiment, a user equipment terminal detects the collision using additional information, e.g., a physical cell identifier, included in or used to generate positioning reference signals sent by two or more base stations and reports the collision to the network, and the network resolves the collision by assigning a different cell identifier to one of the colliding cells.

Figure 5:
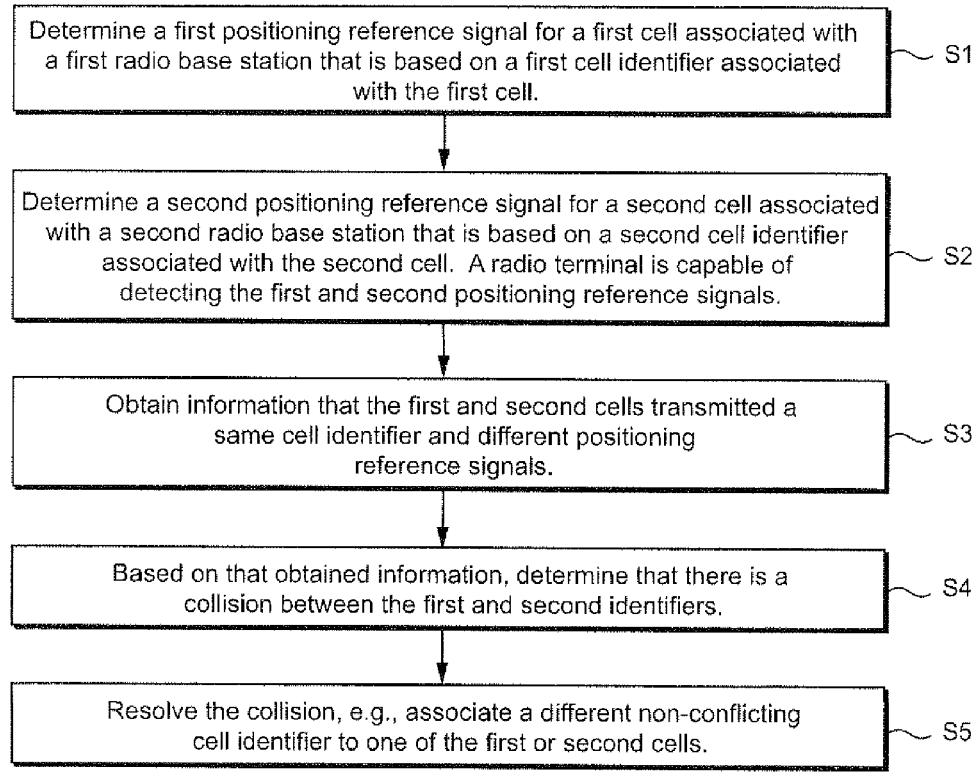
FIG. 5 is a flowchart diagram illustrating non-limiting example steps for detecting and resolving cell identifier collisions.

Reference is now made to the flowchart in FIG. 5 that outlines example procedures for detecting and resolving such cell identifier collisions using positioning reference signals in the context of a radio communications system that includes multiple radio base stations and multiple radio terminals. A first positioning reference signal is determined for a first cell associated with a first radio base station that is based on a first identifier associated with the first cell (step S1). A second positioning reference signal is determined for a second radio base station that is based on a second identifier associated with the second cell (step S2). A radio terminal is capable of detecting the first and second positioning reference signals broadcast by the first and second cells, respectively. Information is obtained from the radio terminal that the first and second base stations transmitted a same base station-associated identifier and different positioning reference signals (step S3). Based on that obtained information, a collision between the first and second identifiers is determined (step S4) either directly by the radio terminal or by the radio terminal sending to a network node information from which the network node can determine the collision. Ultimately, the collision is resolved, e.g., by associating a different, non-conflicting identifier to either of the cells associated with the first base station or the second base station (step S5).

Steps S1-S5 may be performed in the network node. For example, the base station determines a cell identifier by setting that cell identifier. Alternatively, Steps S1-S3—may also be performed in the radio terminal, e.g., the radio terminal determines the cell identifier by detecting the cell identifier. As mentioned above, the radio terminal may also perform step S4.

Figure 6:
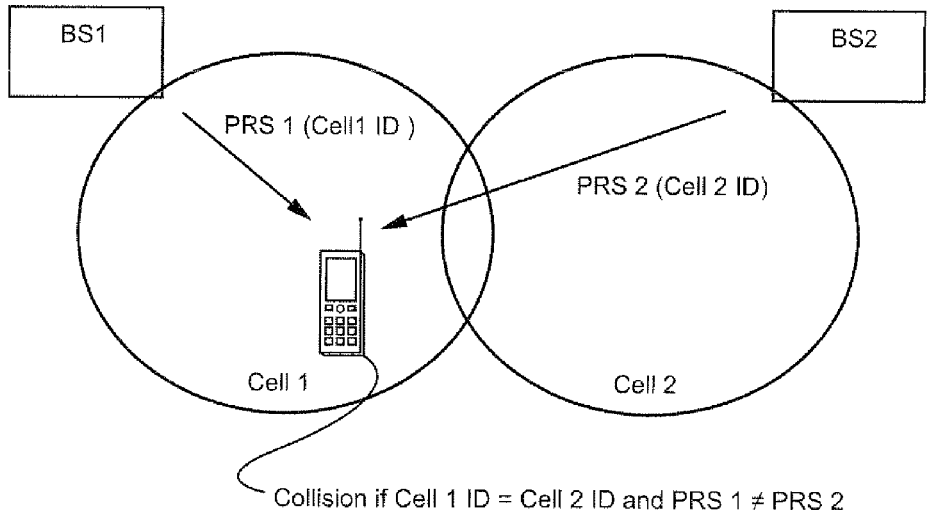
FIG. 6 is a diagram of an example illustration of how collisions may be detected and resolved.

In an example embodiment, the positioning reference signals may each be determined using an associated base station identifier and an offset. A non-limiting illustration is provided in FIG. 6. First base station BS1 includes a first cell 1, and second base station BS2 includes a second cell 2. A UE is located in cell 1 and receives and/or measures signals transmitted from both BS1 and BS2. In this example, BS1 transmits a first position reference signal PRS1 along with additional information corresponding to a cell identifier for cell 1, Cell 1 ID, and BS2 transmits a second position reference signal PRS2 along with additional information corresponding to a cell identifier for cell 2, Cell 2 ID. The UE may use the signals PRS1 and PRS2 perhaps along with other received PRS signals to determine its location using for example one of the location determining techniques described above or some other suitable location determining technique.

The UE compares the two cell identifiers, Cell 1 ID and Cell 2 ID. If they are the same, the UE compares PRS1 to PRS2. If PRS1 and PRS2 are different, then a cell identifier collision is detected. If the cell identifiers match and the PRS signals are different, that means they were transmitted by two different base stations who should have (but do not) different identifiers for their respective cells Cell 1 and Cell 2.

In a further non-limiting example embodiment for 3GPP type systems, each base station transmits a physical cell identifier (PCI) in each of its cells and also transmits a PRS in each of its cells. Additional information is included in, provided by, or linked to the PRS to indicate an extended cell ID by selecting the PRS pattern or PRS sequence using the PCI and an offset. This may also be seen as an extended cell ID (ePCI), where 9 bits of the extended cell ID are represented by the physical cell ID, and additional bits of the extended cell ID are represented by the set of the PRS. In other words, the PRS pattern is determined or selected as a function of the PCI and an offset or as a function of an extended cell ID.

A radio terminal that detects an identical PCI from different cells while also detecting two different sets of the above additional information detects a PCI collision. The detection can be done by the radio terminal, for example, during cell search or regular measurements. The radio terminal reports the PCI collision to one or several network nodes, which can be a base station, an OAM node, a combination of these, or some other network node. The radio terminal report can include, for example, the colliding PCI and the different additional information in the colliding cells, so that the colliding cells with same PCI can be identified by the receiving network node(s). Those network node(s) may resolve the PCI collision by allocating different PCI to one or multiple of the colliding cells. The allocation can be done for example as a reconfiguration of the colliding cell(s) using signaling over X2 protocol or the protocol connecting the eNodeB(s) and the OAM node.

Figure 7:
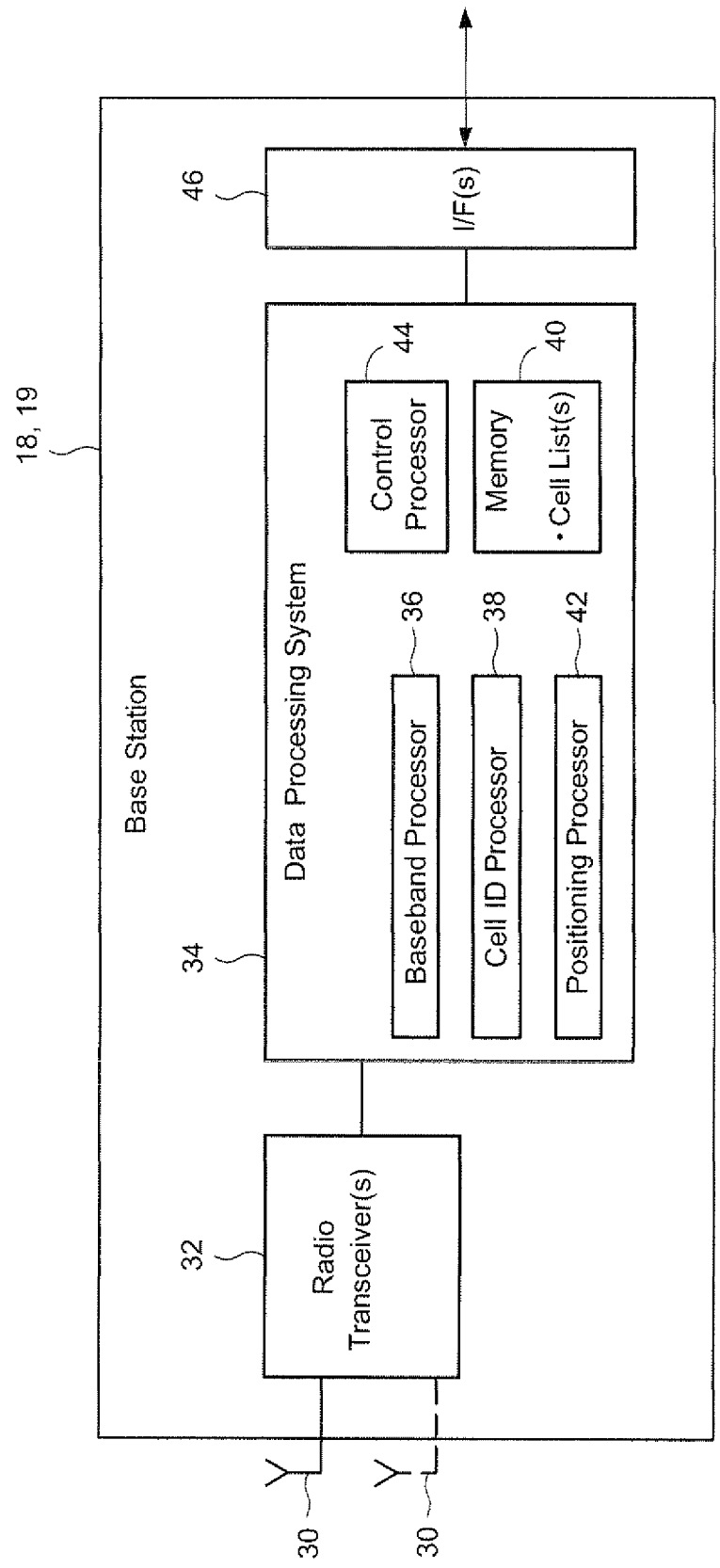
FIG. 7 is non-limiting, example function block diagram of a base station.

FIG. 7 is a non-limiting, example function block diagram of a base station which may be either a macro base station 18 or possibly a femto base station 19. The base station 18, 19 includes one or more radio transceivers 32 coupled to one or more antennas 30 for communicating over the radio interface with radio terminals. The radio transceiver(s) 32 connect to a data processing system 34 which includes a baseband processor 36 that performs baseband processing on the information to be transmitted via the radio transceiver(s) 32 and on signals received from the radio transceiver(s) 32. The data processing system 34 also includes a cell ID processor 38 which performs cell identifier processing including for example cell identifier allocation, cell identifier collision detection, and cell identifier collision resolution processing. A positioning processor 42 selects or otherwise determines PRS sequences or patterns and includes additional information in the PRS or to generate the PRS to indicate an extended cell ID as described in the example embodiment above. Data such as a neighbor cell relation list, a cell identifier list, etc. may be stored in a memory 40. A control processor 44 handles supervisory and coordination processes in the base station. The base station communicates with other network entities via one or more interfaces 46.

Figure 8:
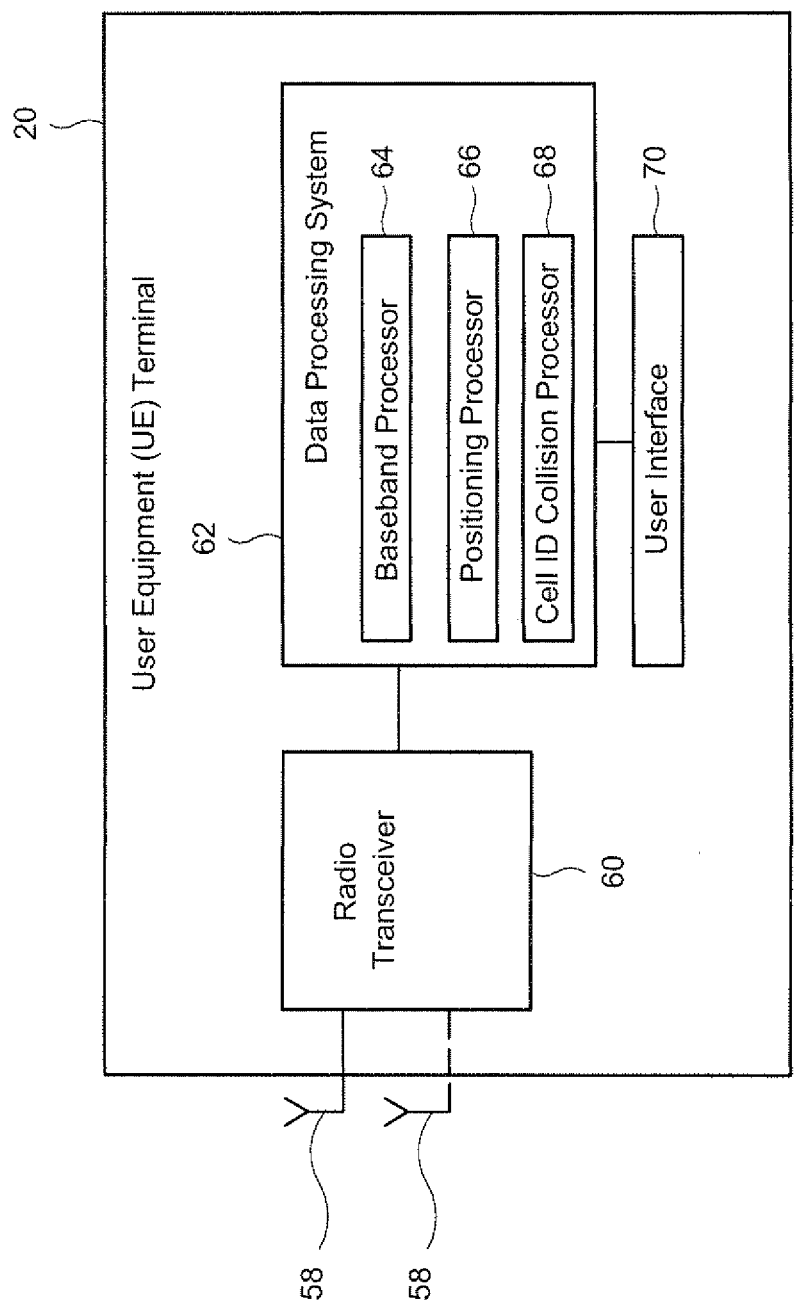
FIG. 8 is non-limiting, example function block diagram of a radio terminal.

FIG. 8 is a non-limiting, example function block diagram of a radio terminal. The radio terminal 20 includes a radio transceiver 60 coupled to one or more antennas 58 for communicating over the radio interface with base stations. The radio transceiver 60 connects to a data processing system 62 that includes a baseband processor 64 that performs baseband processing on the information to be transmitted via the radio transceiver 60 and on signals received from the radio transceiver 60. The data processing system 62 also includes a positioning processor 66 that detects and processes broadcast information from base stations including PRS information and cell ID information. A cell ID collision processor 68 analyzes the PRS and cell ID information for different cells from different base stations to determine whether there is a cell identifier collision as described above. The radio terminal 20 also includes a user interface 70 to permit a user to program the radio terminal and communicate with the radio terminal.

The technology described in this application detects and resolves cell identifier collisions between cells with the help of the UE considering additional information in positioning reference signals. It further reduces the amount of network planning for cell ID allocation, and results in fewer collisions between cell IDs of different cells leading to extended cell coverage, less interference, and improved handover performance throughout the network.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for use in a radio communications system including multiple radio base stations and multiple radio terminals, comprising:
    (a) determining a first positioning reference signal (PRS) for a first cell associated with a first radio base station and further associated with a first cell identifier (PCI);
    (b) determining a second PRS for a second cell associated with a second radio base station and further associated with a second PCI;
    (c) obtaining information indicating that the first and second PCIs are the same and that the first and second PRSs are different, wherein the obtained information comprises a first extended cell identifier corresponding to the first base station and a second extended cell identifier corresponding to the second base station, the first extended cell identifier comprising a first set of bits representing the first PCI and a second set of bits representing the first PRS, and the second extended cell identifier comprising a first set of bits representing the second PCI and a second set of bits representing the second PRS;
    (d) based on that obtained information, determining that there is a collision between the first and second physical cell identifiers;
    (e) resolving the collision by associating a different, non-conflicting cell identifier to either of the first cell or the second cell.

2. The method in claim 1, wherein:
    the radio communications system includes a network node including one of or coupled to the radio base stations, and
    the method is implemented in the network node.

3. The method in claim 2, wherein the obtained information is determined by the radio terminal and transmitted to the network node.

4. The method in claim 2, wherein steps (a) and (b) are also performed in the radio terminal.

5. The method in claim 1, wherein the radio terminal can generate information useable to determine the geographic location of the radio terminal from the first and second positioning reference signals.

6. The method in claim 1, wherein the obtained information includes or may be used to generate a time difference of arrival at the radio terminal between the first and second positioning reference signals and the geographic location of the radio terminal may be determined based on the time difference of arrival using a triangulation technique.

7. The method in claim 1, further comprising:
    detecting that the first and second physical cell identifiers are the same, and
    detecting that the first and second extended cell identifiers are different.

8. The method in claim 1, wherein the radio communications system includes a network including or coupled to the radio base stations, the method further comprising:
    reporting the collision between the first and second identifiers to a node in the network.

9. An apparatus for use in a radio communications system including multiple radio base stations and multiple radio terminals comprising electronic circuitry configured to:
    determine a first positioning reference signal (PRS) for a first cell associated with a first radio base station and further associated with a first physical cell identifier (PCI);
    determine a second PRS for a second cell associated with a second radio base station and further associated with a second PCI;
    obtain information indicating that the first and second PCIs are the same and that the first and second PRSs are different, wherein the obtained information comprises a first extended cell identifier corresponding to the first base station and a second extended cell identifier corresponding to the second base station, the first extended cell identifier comprising a first set of bits representing the first PCI and a second set of bits representing the first PRS, and the second extended cell identifier comprising a first set of bits representing the second PCI and a second set of bits representing the second PRS; and
    based on that obtained information, determine that there is a collision between the first and second physical cell identifiers.

10. The apparatus in claim 9, wherein:
    the radio communications system includes a network node including one of or coupled to the radio base stations, and
    the apparatus is in the network node.

11. The apparatus in claim 10, wherein the obtained information is determined by the radio terminal and transmitted to the network node.

12. The apparatus in claim 9, wherein the radio terminal can generate information useable to determine the geographic location of the radio terminal from the first and second positioning reference signals.

13. The apparatus in claim 9, wherein the electronic circuitry is further configured to:
    detect that the first and second physical cell identifiers are the same, and
    detect that the first and second extended cell identifiers are different.

14. The apparatus in claim 9, wherein the electronic circuitry is further configured to resolve the collision.

15. The apparatus in claim 14, wherein the electronic circuitry is further configured to resolve the collision by associating a non-conflicting cell identifier to either of the first cell or the second cell.

16. A radio terminal for use in a radio communications network including multiple radio base stations, comprising:
   radio transceiving circuitry, and
   a data processing system coupled to the radio transceiving circuitry including electronic circuitry configured to:
   (a) detect a first positioning reference signal (PRS) for a first cell associated with a first radio base station and further associated with a first physical cell identifier (PCI);
   (b) detect a second PRS for a second cell associated with a second radio base station and further associated with a second PCI;
   (c) determine that the first and second PCIs are the same and that the first and second PRSs are different based on a received a first extended cell identifier corresponding to the first base station and a received second extended cell identifier corresponding to the second base station, the first extended cell identifier comprising a first set of bits representing the first PCI and a second set of bits representing the first PRS, and the second extended cell identifier comprising a first set of bits representing the second PCI and a second set of bits representing the second PRS; and
   (d) generating information for transmission to the radio network indicating that there is a collision between the first and second identifiers or from which a node in the radio network may determine that there is a collision between the first and second cell identifiers, wherein the information comprises at least one extended cell identifier.

17. The radio terminal in claim 16, wherein the electronic circuitry is configured to generate information useable to determine the geographic location of the radio terminal from the first and second positioning reference signals.

* * * * *